United States Patent [19]

Andrei-Alexandru et al.

[11] 4,123,694
[45] Oct. 31, 1978

[54] CIRCUIT ARRANGEMENT FOR A WIPER DRIVING MOTOR

[75] Inventors: Marcel Andrei-Alexandru, Bietigheim-Bissingen; Gunther Gille, Sersheim; Horst Goertler, Sachsenheim; Hans Prohaska, Bietigheim-Bissingen; Walter Steeb, Bittenfeld; Wolfgang Spieth, Freiberg, all of Germany

[73] Assignee: ITT Industries, Inc., New York, N.Y.

[21] Appl. No.: 755,502

[22] Filed: Dec. 29, 1976

[30] Foreign Application Priority Data

Oct. 9, 1976 [DE] Fed. Rep. of Germany ....... 2645707

[51] Int. Cl.² .............................................. H02P 1/04
[52] U.S. Cl. .............................. 318/443; 318/DIG. 2; 318/466
[58] Field of Search ................. 318/466, DIG. 2, 443, 318/286, 483

[56] References Cited

U.S. PATENT DOCUMENTS

| 2,307,204 | 1/1943 | Ehrlich | 318/466 |
| 2,732,523 | 1/1956 | Schnepf | 318/466 |
| 2,825,019 | 2/1958 | Harrison | 318/466 |
| 3,003,098 | 10/1961 | Simpson | 318/DIG. 2 |
| 3,497,790 | 2/1970 | Tixier | 318/466 |

FOREIGN PATENT DOCUMENTS 251,332   4/1963   United Kingdom ..................... 318/466

Primary Examiner—David Smith, Jr.
Attorney, Agent, or Firm—James B. Raden; William J. Michals

[57] ABSTRACT

A circuit arrangement for a wiper motor, of the type comprising a controllable switching element for switching a motor operating circuit, wherein the switching element is controllable by a manually actuable operating switch and by a disconnection signal of a limit switch. The disconnection signal of the limit switch is directly conducted to the switching element through the motor supply lead itself. Thus, an inexpensive single-conductor cabling arrangement is realized.

25 Claims, 14 Drawing Figures

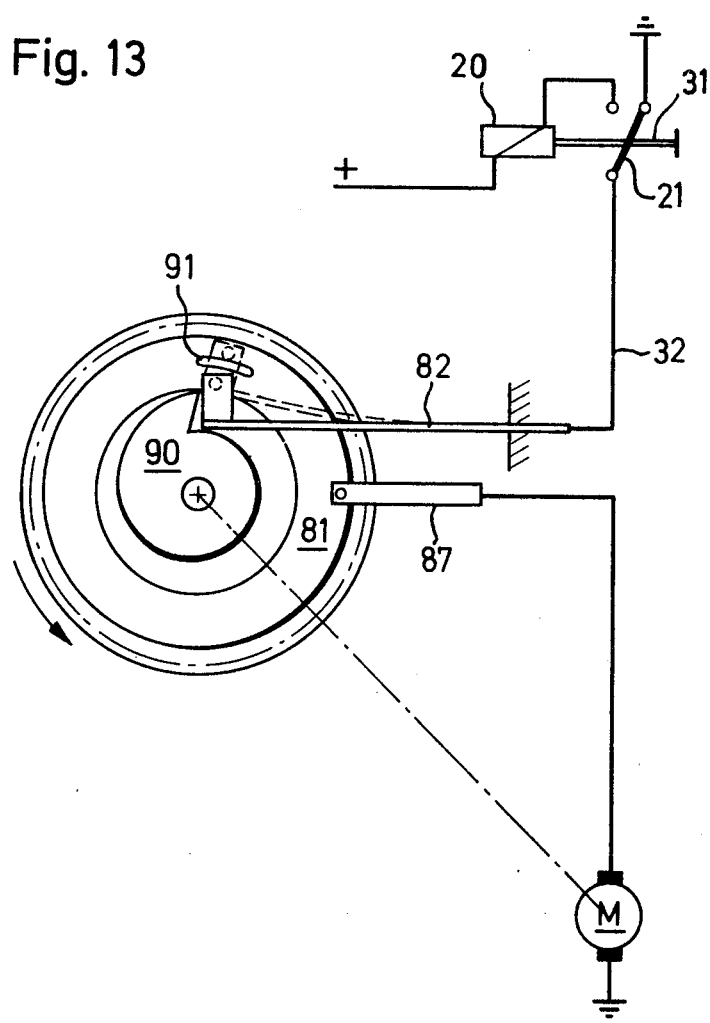

CIRCUIT ARRANGEMENT FOR A WIPER DRIVING MOTOR

BACKGROUND OF THE INVENTION

This invention concerns a circuit arrangement for a driving motor, especially a wiper motor, comprising a controllable switching element for switching a motor operating circuit, said switching element being controllable by a manually actuable operating switch and by a disconnection signal of a limit switch.

In a known circuit arrangement of this type a relay serves as a controllable switching element the change-over contact of which alternately closes the motor operating circuit or a motor short circuit. The winding of said relay in connection series with the operating switch is directly connected to the supply voltage. In parallel to the operating switch a limit switch operating as a circuit-breaker is located, through which the relay is kept in operating position also with switched off operating switch for so long, until the wiper driven by the motor has reached a parking position. The relay can thus be switched off by a disconnection signal of the limit switch, which is conducted through a separate control lead. From the switch to the driving motor of this known type thus two cables have to be layed, namely on the one hand the motor supply lead and secondly a control lead through which the disconnection signal of the limit switch is conducted to the controllable switching element. This circuit arrangement is therefore very expensive, especially if — as it is for instance the case with rear window wiping installations of automotive vehicles — the switch is located remote from the driving motor. Then quite a lot of cable material is required for the supply lead and for the control lead which entails corresponding costs, whereby it has also to be considered that it is always connected with difficulties to place a lead additionally into an available cable conduit of an automotive vehicle.

These disadvantages are avoided, according to the present invention, as the disconnection signal of the limit switch is directly conducted to the switching element through the motor current supply cable.

SUMMARY OF THE INVENTION

In realizing this idea between the switch and the driving motor consequently only one supply cable is necessary, for the earth connection is usually effected through the vehicle body. The disconnection signal can be generated and evaluated in various manners, but in a preferred embodiment the limit switch is directly connected to the motor current supply cable as a circuit-breaker and the switching element of which responds to a change in the motor current. In such a design no additional switching elements are necessary in comparison to the known arrangement, for the motor operating current intensity is directly used as a disconnection signal.

In a particularly simple and approved design the switching element is a current relay, the winding of which is series connected with the limit switch to the motor circuit and the movable switching contact of which closes the motor circuit in operating position. The current relay thus is really operating as a storage unit which is set by actuation of the operating switch and remains in this position also, when the operating switch is switched off until the circuit through the winding, at the same time being motor operating circuit, is interrupted by the limit switch for a short time. Whereas thus in the known circuit arrangement the winding of the relay is connected with a circuit in parallel to the motor operating circuit and either may be energized through the operating switch or the limit switch, in this embodiment the winding with the limit switch is series connected with the motor operating circuit, so that the additional control lead of the known circuit arrangement is no longer necessary.

In this embodiment, however, the current relay releases for a short time in each operating cycle, also when the operating switch is switched off. It has therefore to be taken care that the interruption of the motor current is so short that the limit switch is again brought into its operating position by the flywheel moment of the motor. On the other hand the motor current must be interrupted so long that a reliable release of the relay in the end position is ensured. With known limit switches actuated by cams and carefully dimensioned and harmonized it may also happen that, for instance during a short-time interruption of the operating voltage, the driving motor stops in a position in which the circuit is interrupted through the winding of the relay. Then the winding of the relay could no longer be energized, when the operating switch was actuated anew and thus the driving motor would not be put in operation. This disadvantage can simply be eliminated in that according to a development of the invention the switching path of the limit switch is bridged by a by-pass switching element. This by-pass switching element can have a time characteristic and for instance be designed as a bimetal switch. In another embodiment of the invention the limit switch has a monostable behavior in order to ensure that the motor is started again, whereby in the instable phase the current is reduced or interrupted for a short time. Such a monostable limit switch thus automatically returns into the operating position after each short-time interruption of current, in which the circuit through the winding of the relay can be closed through the operating switch.

A monostable limit switch according to an advantageous development can in a very simple manner be realized as an energy storage unit which is charged in the stable switching phase and during the instable switching phase its released energy is used for a short-time interruption of circuit.

The limit switch of a preferred embodiment is provided with a pendulum which may be deflected against the tension of the spring element from a rest position in the stable switching phase, whereby the spring element is tensioned, and said pendulum in the stable switching phase swings beyond the rest position in reverse direction and thereby for a short time removes a contact spring from a stationary contact. Because the pendulum automatically returns to its rest position after the spring element serving as a storage unit is released, thus a permanent interruption through the limit switch is not possible.

This idea can also be realized with limit switches comprising a switch wafer, the contact spring of which directly serves as an energy storage unit, said contact spring in its rest position being supported on a contact path and in the instable switching phase sliding over a contact gap.

BRIEF DESCRIPTION OF THE DRAWING

The invention with further advantageous developments is described in detail by way of the embodiments shown in the accompanying drawing in which.

DETAILED DESCRIPTION

Figure 1:
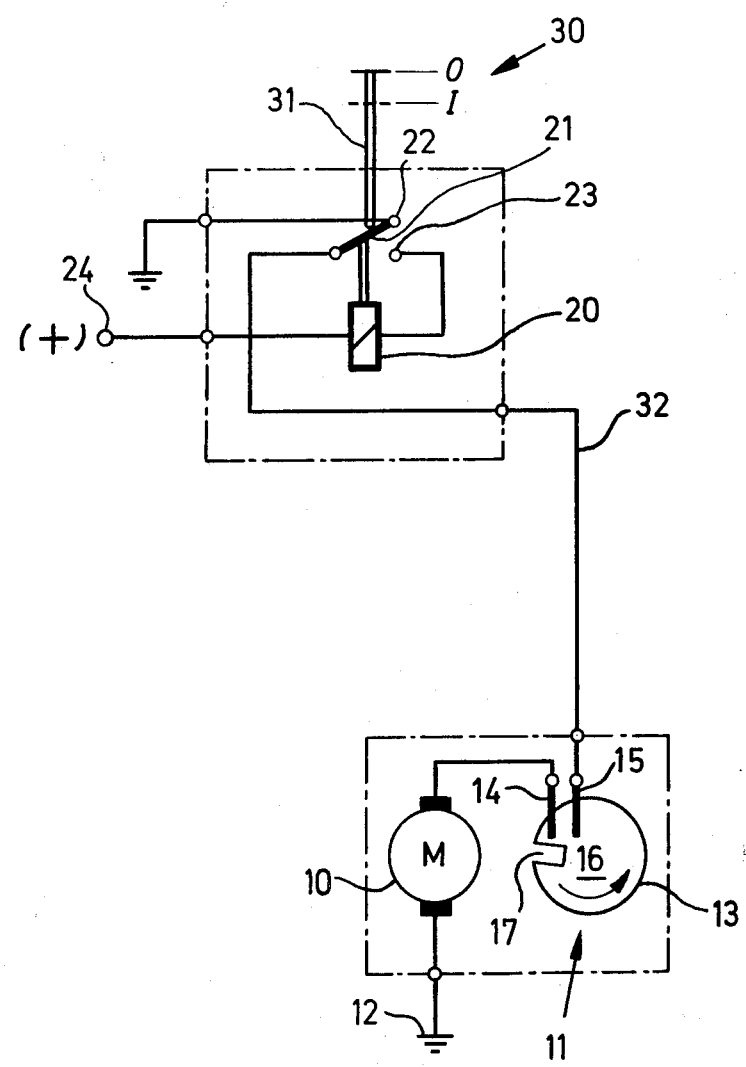
FIG. 1 is a circuit diagram comprising a relay as a switching element which is combined to a constructional unit with the operating switch.

The basic idea of the invention is described below by means of FIG. 1. A wiper motor 10 includes a mechanically coupled limit switch shown generally at 11 is directly connected to the earth 12 through the body of the automotive vehicle. The limit switch 11 has a switch wafer 13 upon which contact springs 14 and 15 are resiliently supported. The contact spring 15 rests on the contact path 16 of the switch wafer 13 which has a contact gap 17 on which the contact spring 14 provides an open circuit during a portion of the operating cycle of motor 10 the latter of which is coupled to mechanically rotate wafer 13. The limit switch 11, which is combined to a constructional unit with the wiper motor 10 thus functions as a circuit-breaker which opens normally closed contacts 14 and 15 during a portion of the operating cycle of wiper motor 10.

In the embodiment according to FIG. 1 a current relay 20 comprising a movable changeover contact 21 serves as a controllable switching element for switching the motor circuit. The rest contact 22 of said current relay 20 is connected to earth, the operating contact 23 is directly connected with the winding. The winding of the current relay 20 on the other hand is directly connected with the supply voltage 24.

In the drawing the operating switch 30 is only shown schematically and comprises a driver rod 31 which is directly acting on the changeover contact 21 or on the armature of the current relay 20 and reversing it on the operating contact 23 when the operating switch 30 is actuated. In this embodiment the operating switch and the controllable switching element are thus combined to a unit and — as can be clearly seen from the drawing — connected to the motor 10 through a single connecting lead 32. Said connecting lead thus on the one hand serves as a motor supply lead and on the other hand also as a control lead for the current relay 20, for through it the disconnection signal which is generated by the limit switch 11 is conducted to the current relay 20 as can be seen from the following description of the mode of operation of this circuit arrangement. Thus, the function and operation of relay 20 is to provide a switching element which "locks-up" through its own contacts (21 and 23) when movable contact 21 engages contact 23. The "locked-up" relay 20 remains so energized until limit switch contacts 14 and 15 provide an open circuit.

FIG. 1 shows the operating condition with arrested wiper motor 10, whereby the wiper is located in the given parking position. The two contact springs 14 and 15 are thereby electrically conductive connected through the contact path 16. The wiper motor 10 is started by actuating the driver rod 31 of the operating switch 30, which reverses the changeover contact 21 on the operating contact 23. Thereby a circuit from the supply voltage 24 through the winding of the current relay 20, the changeover contact 21, the motor supply lead 32, the contact springs 14 and 15 to the wiper motor 10 is closed. The current relay 20 is thus energized and holds the changeover contact 21 in operating position, also when the driver rod 31 returns to the rest position shown in the drawing. The current relay thus holds itself through the changeover contact 21 and practically works as a storage unit which maintains the motor current also when the operating switch is switched off.

The switch wafer 13 of the limit switch 11 also rotates with the movement of the motor 10. If the contact spring 14 is now supported on the contact gap 17, the motor circuit is interrupted for a short time. This interruption of the motor current is used as a switching signal of the limit switch 11 and conducted to the current relay 20 through the motor supply lead 32 which thus simultaneously serves as a control lead. The current relay 20 responds to this interruption of the motor current and deenergizes. If at this moment the driver rod 32 is in the shown position, through the rest contact 22 a short circuit for the motor 10 is closed as soon as the two contact springs 14 and 15 are connected electrically conductive through the contact path 16. The motor is thereby stopped abruptly. If, however, the changeover contact 21 is arrested in its operating position through the driver rod 31, the current relay 20 energizes immediately after it was deenergized and maintains the motor circuit. Thereby it has to be ensured that the flywheel moment of the motor 10 is sufficient to turn the switch wafer 13 so far that the contact spring 14 is again supported on the contact path 16. On the other hand the contact gap 17, however, must be so big that the interruption of current lasts so long that it is sufficient for a reliable deenergizing of the current relay 20.

In this embodiment the winding of the current relay 20 the movable switching contact 21 of which as well as the limit switch 11 are thus connected in series with the motor circuit, so that a single connecting lead 32 is sufficient which, at the same time, serves as a current supply and control lead. In comparison to the above-mentioned known circuit arrangement especially for wiper installations for rear windows of automotive vehicles considerable savings are made, for in spite of simpler cabling no additional components are required.

Figure 2:
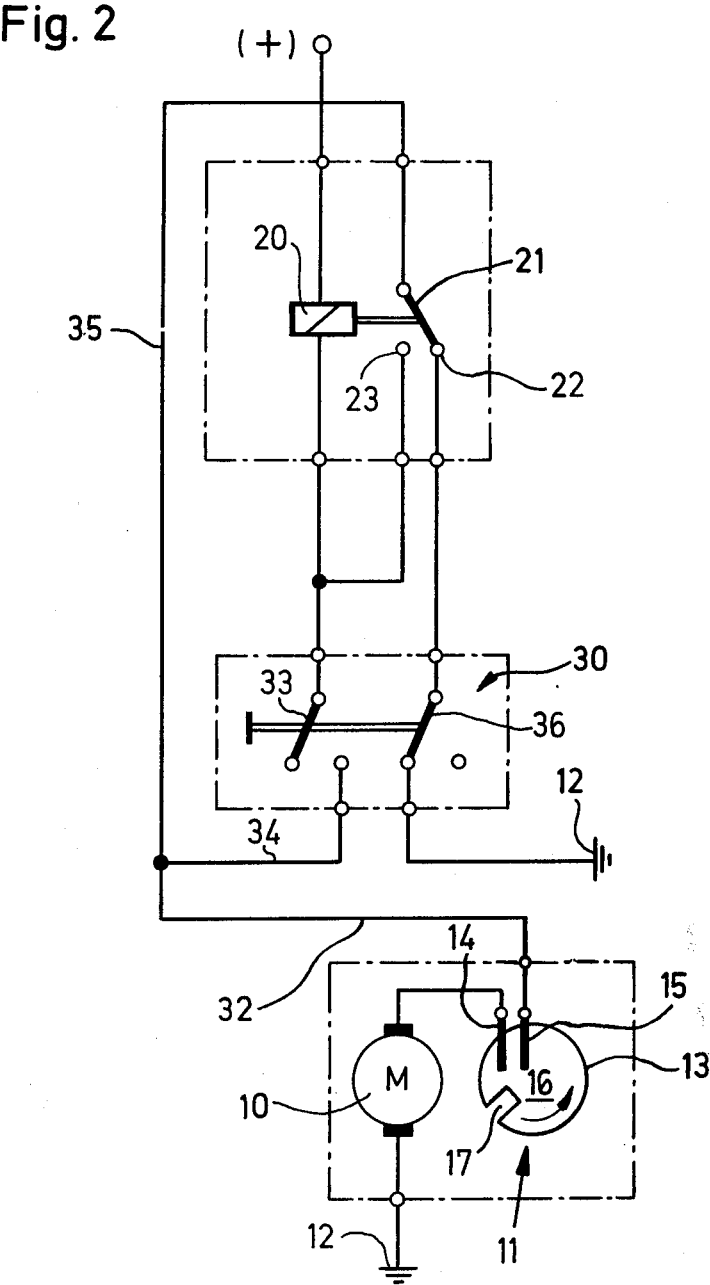
FIG. 2 is a circuit diagram comprising a relay as a switching element and a separate operating switch.

In the embodiment according to FIG. 2 the movable changeover contact 21 of the current relay is not arrested mechanically through the operating switch 30, but held through a subsidiary circuit. A switching contact 33 of the operating switch 30 at first conducts the motor current when it is operated, so that the current relay 20 is energized. The switching path is thereby bridged by the leads 34 and 35 through the switching contact 33 of the operating switch 30, so that the current relay 20 also maintains the motor circuit until the limit switch 11 interrupts this circuit, when the operating switch 30 is switched off.

Figure 3:
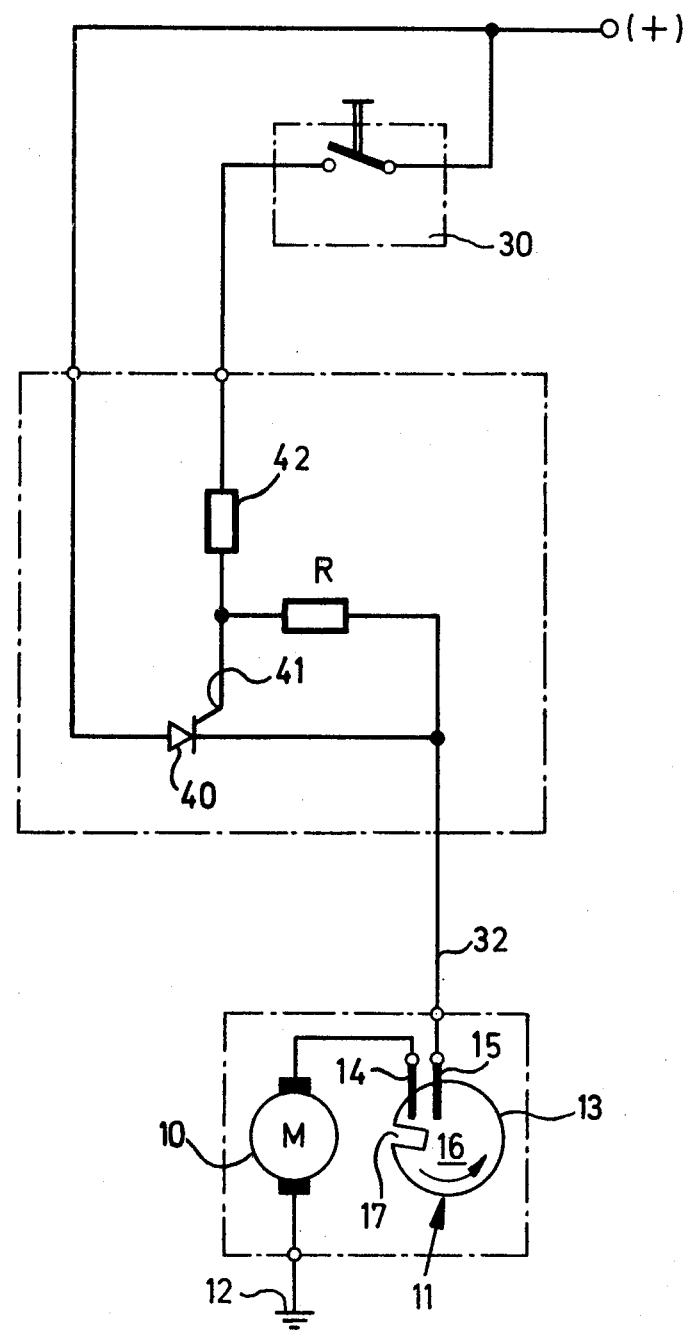
FIG. 3 is a circuit diagram comprising a thyristor as a switching element.

In the embodiment according to FIG. 3 a thyristor 40 connected in the motor circuit serves as a controllable switching element, the gate terminal 41 of which is connected to the operating switch 30 through a series resistor 42. Said thyristor 40 also has a storage characteristic, for after firing through the operating switch 30 it maintains the motor operating current for so long until the motor operating current falls below the holding current upon interruption through the limit switch 11. When the operating switch is actuated the thyristor 40, however, is very quickly fired, so that the wiper motor continues running as required. If, on the other hand, the operating switch 30 interrupts the firing circuit of the thyristor 40, after an interruption of the operating current for a short time the wiper motor slows down. Also in this embodiment the interruption of the operating current is used as a disconnection signal, which is signalized to the thyristor 40 representing the controllable switching element through the motor supply lead 32.

In the switching arrangements described until now it can for instance occur, when the supply voltage is interrupted for a short time, that the wiper motor slows down to a position in which the contact spring 14 is supported on the contact gap 17. Then the wiper motor can no longer be started, because the motor circuit can no longer be closed, when the operating switch is actuated. In the embodiments described hereinafter, a reliable starting of the motor is nevertheless ensured. In the embodiments according to FIGS. 4 to 8 the switching path of the limit switch 11 is bridged through a by-pass switching element 50. A bimetal switch 51 can serve as a by-pass switching element the filament winding 52 of which is connected with the motor circuit.

Figure 4:
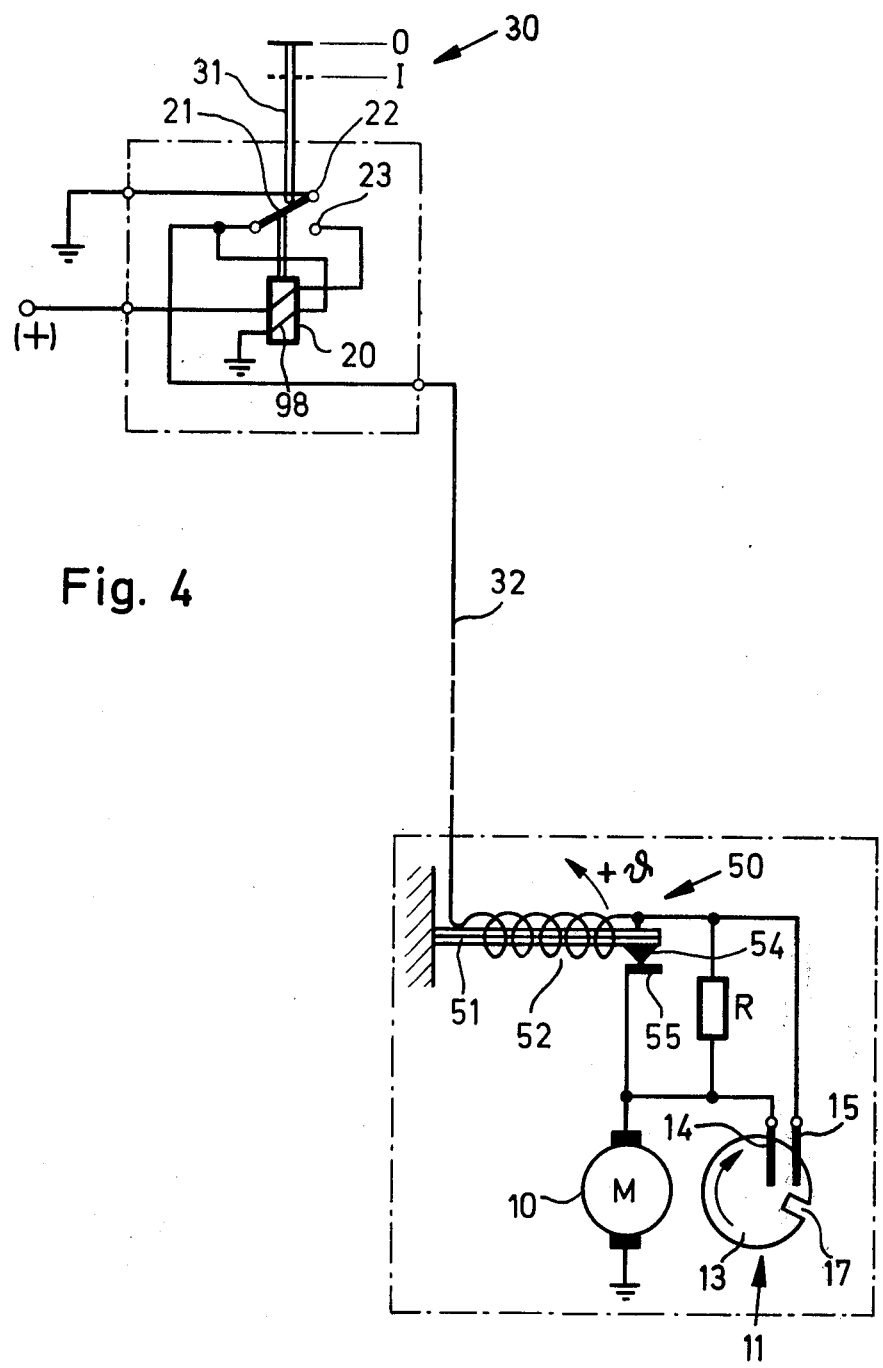
FIG. 4 is a circuit diagram with a by-pass switching element as a starting aid.

In the embodiment according to FIG. 4 the filament winding 52 is series connected to the limit switch 11 and the switching path of the bimetal switch is closed in the rest position through the contacts 55 and 54. When the wiper motor is switched on thereby the motor circuit is closed at first through said contacts of the bimetal switch, so that the current relay 20 is energized. The limit switch 11 is inactive as long as after a certain heating-up time the contact 54 of the bimetal switch is removed from the contact 55. The motor of this embodiment can be started without delay, but the filament winding of the bimetal switch has to be designed as a current winding. It has also to be ensured that the switching path through the contacts 54 and 55 is also interrupted at a very low outside temperature before the first interruption of circuit is effected through the limit switch 11, because otherwise under certain circumstances the wiper motor would continuously run unintentionally long.

Figure 5:
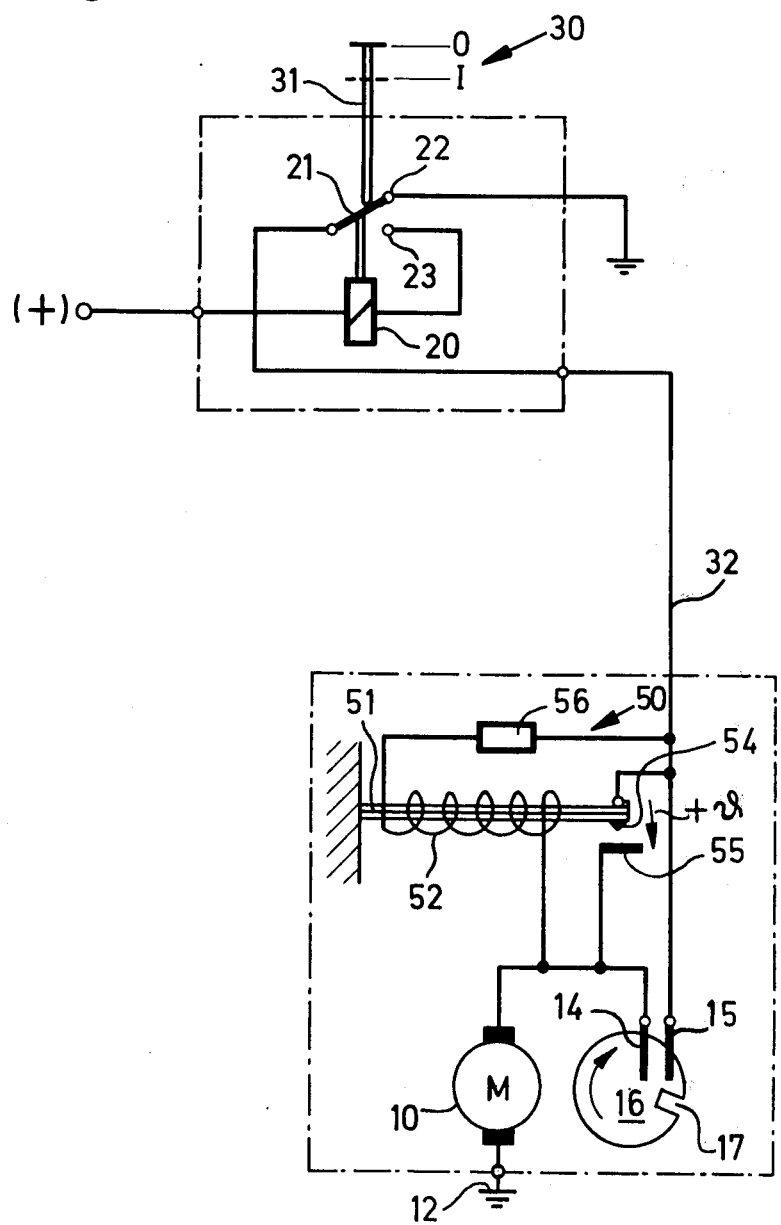
FIG. 5 is an alternative solution to FIG. 4.

In the embodiment according to FIG. 5 the filament winding 52 of the bimetal switch 51 is connected in parallel to the limit switch 11 through a series resistor 56 and the switching path through the contacts 54 and 55 is opened in the rest position. If in this embodiment in case of interruption the contact spring 14 stands on the contact gap 17, this switching path is closed after a certain heating-up time of the bimetal switch through the contacts 54 and 55. The motor can thus be started in any given switching position of the switch wafer 13, whereby the filament winding of the bimetal switch 51 is short-circuited through the limit switch 11 as soon as the contact springs 14 and 15 are connected electrically conductive through the contact path 16. After a certain cooling time the switching path opens through the contacts 54 and 55, so that now also the wiper motor can be switched off. In a wiper installation of this type after an interruption as mentioned above a delay for its switching on has to be accepted.

Figure 6:
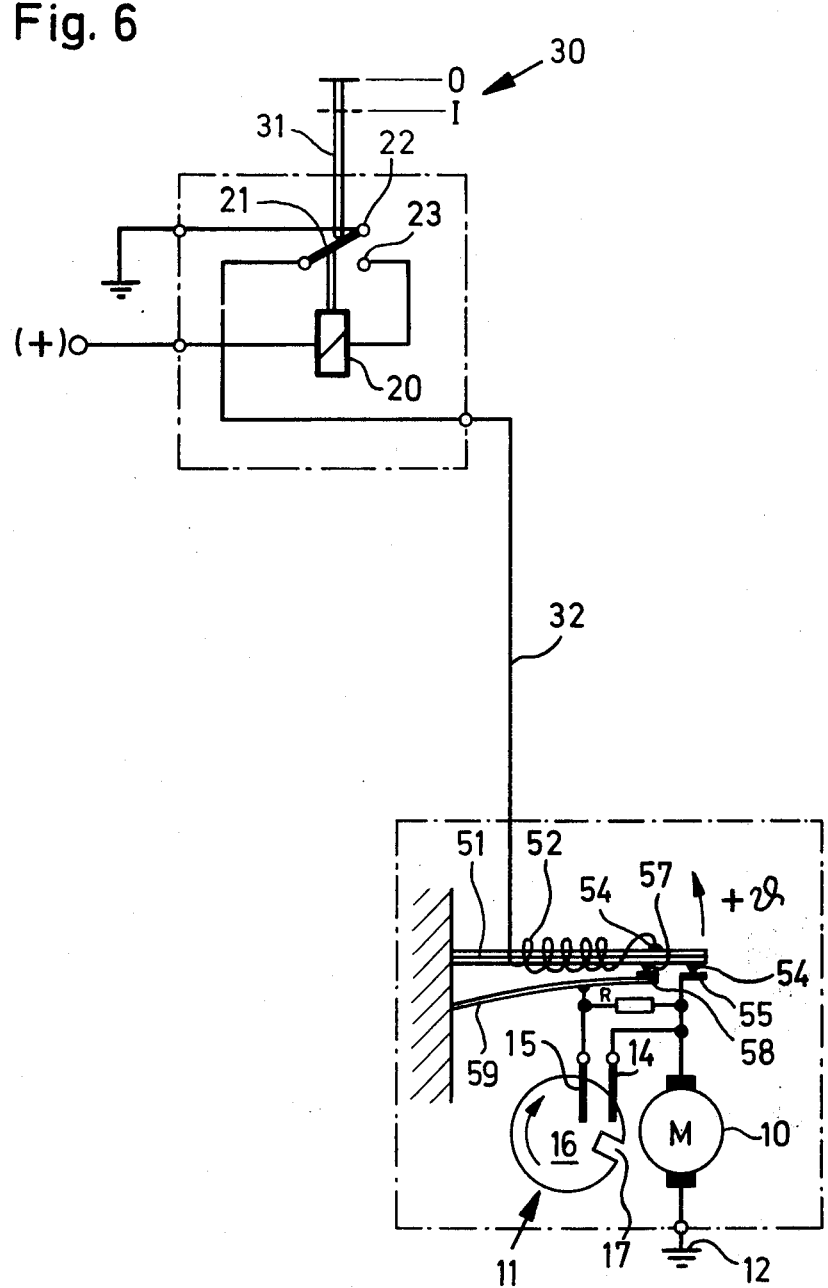
FIG. 6 is a further alternative solution to FIG. 4 with additional overcurrent circuit-breaker.

The embodiment according to FIG. 6 is similar to that of FIG. 4, but the bimetal switch 51 has a further contact set comprising the contacts 57 and 58. Normally the operating current of the wiper motor 10 flows through the filament winding 52 of the bimetal switch 51. Thereby the bimetal switch 51 is heated up so far that the contact 54 is removed from the contact 55. The contact 58 fastened on a resilient contact tongue 59 can, however, follow this movement and therewith remains in conductive connection with the contact 57. If, however, the wiper motor 10 is blocked, the current consumption is increased considerably which results in the fact that now also the contact 57 is removed from the contact 58, because the contact tongue 59 can no longer follow the movement. Thereby in a simple manner an overcurrent circuit-breaker is realized, which effectively prevents a burnout of the armature winding of the wiper motor 10.

Figure 7:
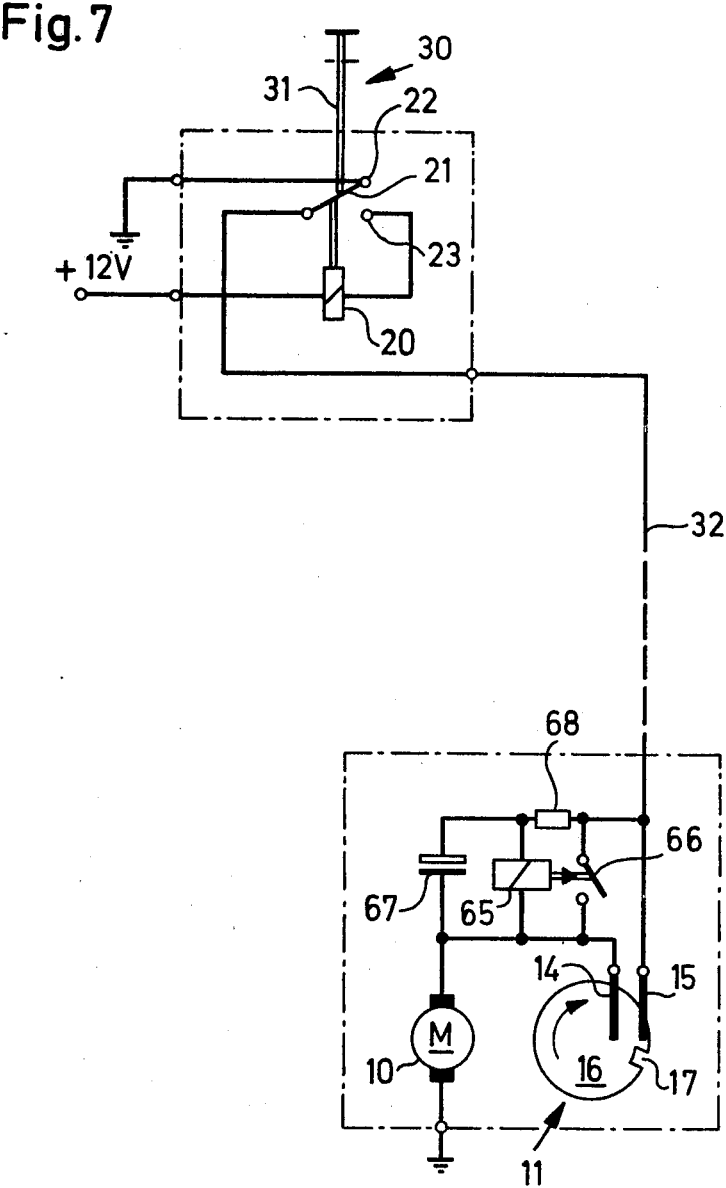
FIG. 7 is a further alternative solution to FIG. 4 comprising a relay as a by-pass switching element.

In the embodiment according to FIG. 7 a relay 65 with a switching contact 66 serves as a by-pass switching element, said switching contact being connected in parallel to the limit switch 11. When the contact spring 14 stands on the contact gap 17 a capacitor 67 is charged through the resistor 68. As soon as the charging voltage has reached the starting voltage of the relay 65, it is energized and closes the motor circuit. If the contact springs 14 and 15 are again in conductive connection with each other through the contact path 16 the capacitor 67 is discharged, so that now the limit switch takes over its function again.

Figure 8:
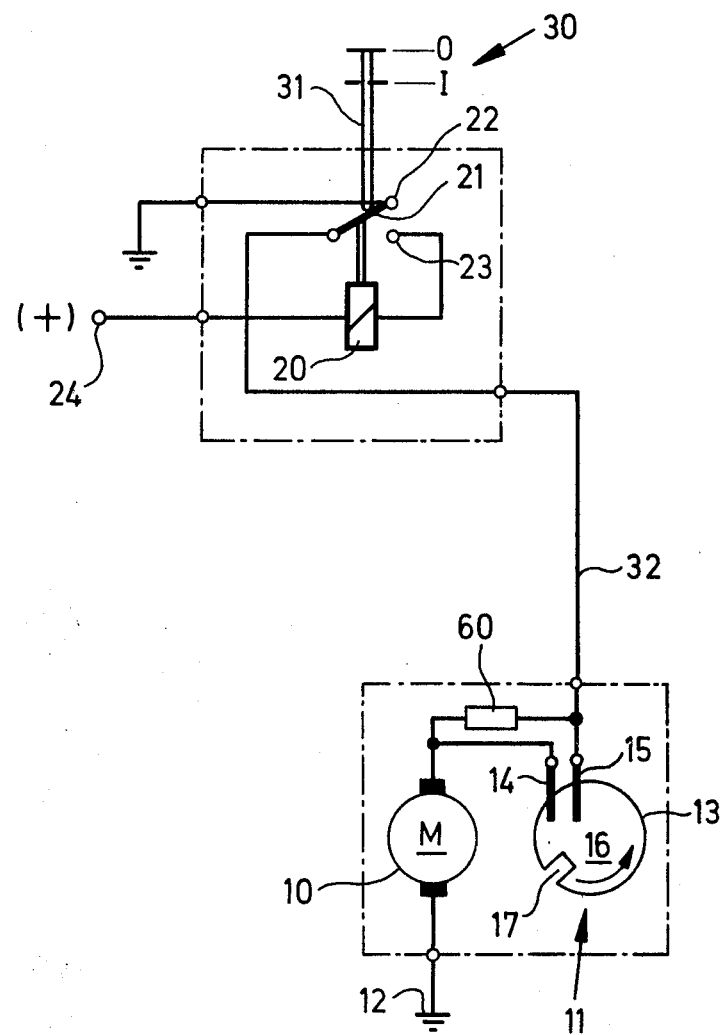
FIG. 8 is a further alternative solution to FIG. 4 comprising a resistor as a by-pass switching element.

Whereas the by-pass switching element 50 of the above mentioned embodiments bridges the switching path of the limit switch only for a short time, in the embodiment according to FIG. 8 a permanent bridging by means of a resistor is provided. This resistor has, however, to be layed out for heavy load, for in case of an interruption it conducts the motor current. By this embodiment it is to be shown that the subject matter of invention cannot only be realized in that the motor circuit interruption is used as a disconnection signal, rather that a reduction of the motor current is sufficient, if in the parking position this resistor 60 is periodically connected with the motor circuit. Finally embodiments can be imagined in which in the parking position of the wiper the motor current is increased and the disconnection signal is derived therefrom.

Until now the assumption was that in a case of interruption the contact spring 14 stands on the contact gap 17 and therefore additional measures have to be taken in order to ensure that the wiper motor can be started in any operating position. Other embodiments being in principle different are described below, the limit switch of which has a monostable behavior and in the instable phase the motor current is reduced or interrupted for a relatively short time. With such a limit switch thus it is excluded, that its effectiveness is neutralized through the by-pass element for a short time.

Figure 9:
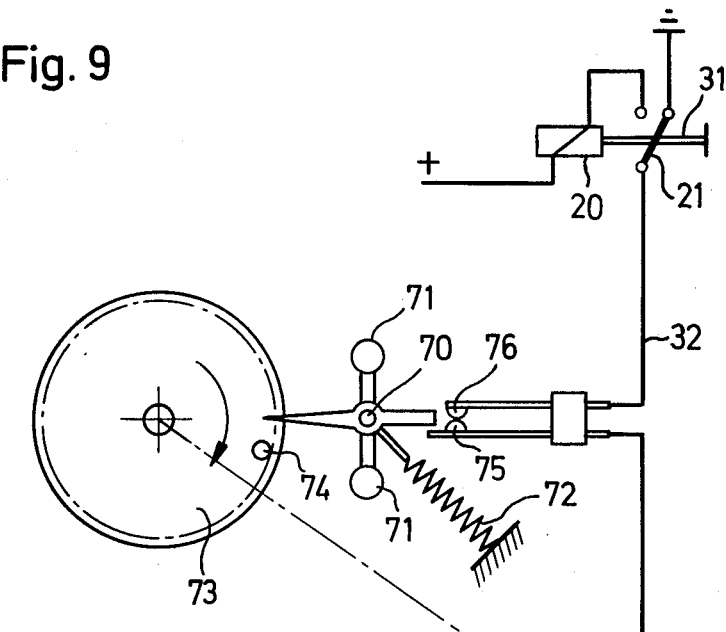
FIG. 9 is a circuit arrangement comprising a monostable limit switch with a pendulum.

The limit switch according to FIG. 9 has a pendulum 70, which in its mass center is arranged to oscillate and because of additional masses 71 has a great inertia moment. A spring element 72 acts on the pendulum 70, said spring element being untensioned in the position shown. A gear wheel 73 being provided with a switching cam 74 is driven by the wiper motor. The one end of the pendulum 70 projects into the circular path of said switching cam 74 in a way that the pendulum may be deflected against the force of the spring element. In a stable switching phase a contact spring 75 firmly rests on a stationary contact 76, so that the motor operating circuit is closed. In this stable switching phase the pendulum is deflected and the spring element 72 is thereby initially tensioned. When the switching cam 74 releases the pendulum 70 again, it swings beyond its rest position and thereby for a short time removes the contact spring 75 from the stationary contact 76. Finally the pendulum occupies again the rest position shown. Thus, in this embodiment the limit switch interrupts the motor circuit when the switching phase is instable.

Figure 10:
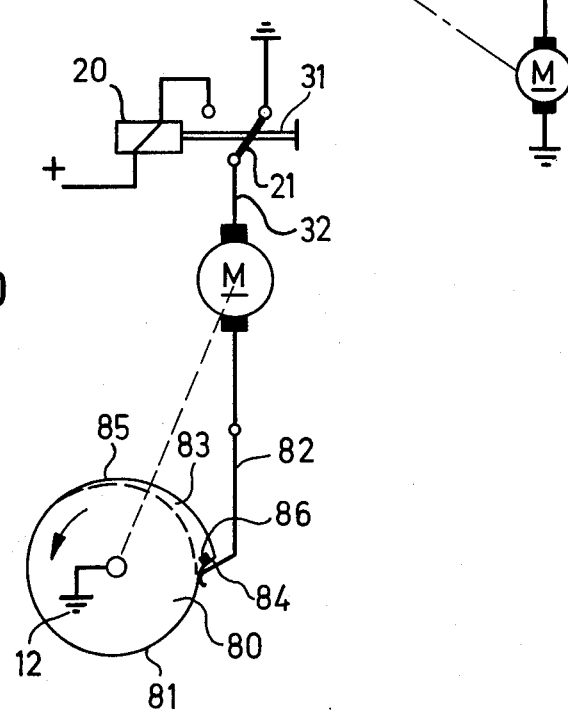
FIG. 10 is a circuit arrangement comprising a monostable limit switch with a switch wafer; and, FIGS. 11 to 14 are alternative designs in accordance with the present invention.

The same effect is achieved with the embodiment according to FIG. 10. A switch wafer 80 driven by the motor and made of electrically conductive material on its outer circumference has a contact path 81, on which a contact spring 82 is supported. A switching cam 83 projects from the contact path, the inclined flank 84 of which is substantially steeper than the ascending flank 85. An insulating portion 86 is embedded in the inclined flank 84. If the switch wafer 80 is moved into the direction of rotation shown, the contact spring 82 is deflected and thereby initially tensioned, but in this stable switching phase remains in conductive connection with the switch water 80 and thereby with the ground terminal 12. The energy stored in the contact spring 82 is released, when said contact spring springs back to the contact path 81 and thereby for a short time slides over the insulating portion 86. In this instable switching phase the motor current is interrupted for a short time, whereby this interruption is automatically discontinued. This is ensured, when the initial tension of the contact spring 82 with regard to the steepness of the inclined flank 84 and to the ratio of friction is accordingly harmonized.

Figure 11:
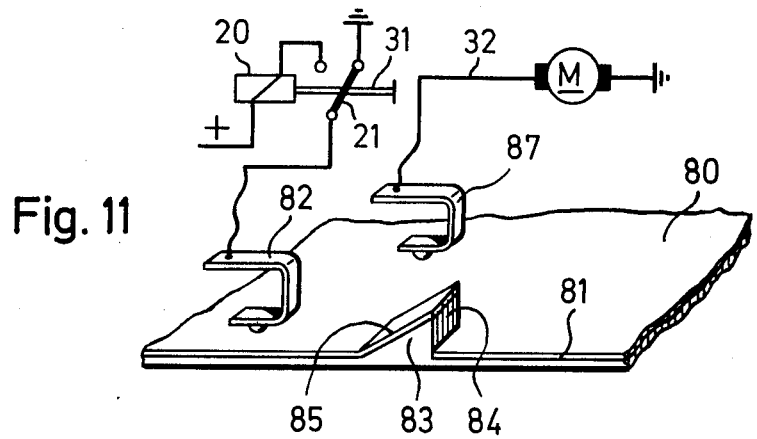

In FIG. 11 the substantial section of a switch wafer 80 is shown to the front side of which the contact path is attached. Again a switching cam 83 is provided, the ascending flank 85 of which is in conductive connection with the contact path. The inclined flank 84 is located approximately vertical to the contact path 81 on which a further contact spring 87 slides. The time during which the contact spring 82 springs back on the contact path 81 via the inclined flank 84 of the switching cam 83 representing the contact gap, is sufficient to release the current relay 20.

Figure 12:
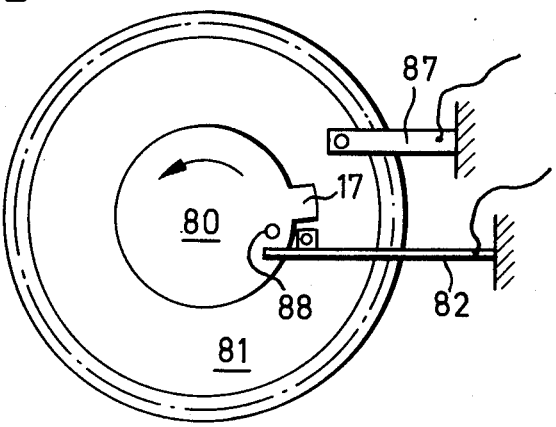

In the embodiments according to FIGS. 10 and 11 the contact spring is deflected transversally to the guide motion of the contact spring in the stable switching position in which it is in conductive connection with the stationary contact. In the embodiment according to FIG. 12 the contact spring 82 on the contrary is deflected into the guide motion of the contact path 81 and thereby initially tensioned by a tripping pin 88 mounted on the switch wafer 80 whereby it remains conductively connected with the contact path 81. During its springing back the contact spring 82 slides very quickly over the contact gap 17 in the contact path 81 and afterwards is again supported on it, so that a conductive connection to the other slide spring 87 is effected.

In the embodiment according to FIG. 13 in the stable switching phase and in the plane of the contact path 81 the contact spring 82 is deflected by an eccentric cam 90 and thereby initially tensioned. During its springing back it slides over a slot 91 realizing the contact gap.

Figure 14:
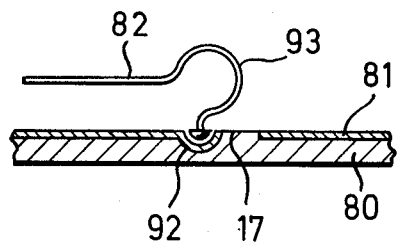

The switch wafer 80 according to FIG. 14 has a recess 92 in the area of the contact path 81 with which engages the end 93 of the contact spring 82 being shaped like an arch, especially being bent in U-shaped manner. Thereby said arch-shaped end is initially tensioned by the movement of the switch wafer. As soon as a certain initial tension is exceeded the end of the contact spring springs out of the recess 92 and in opposite direction to the guide motion of the contact path slides very quickly over the contact gap 17 which is adjacent to the recess 92.

In all these embodiments the limit switch has a monostable behavior, whereby in the stable switching position the motor circuit is closed and only in an instable switching position is interrupted for a short time. Thereby these embodiments are based on the principle that an energy storage unit, namely the spring element, is charged in the stable switching phase, and the energy of said storage unit being released during the discharge serves for a short-time interruption of the motor current. Because the energy stored in the storage unit is limited, the time of current interruption is limited too, so that for these embodiments no additional by-pass switching elements are necessary as a starting aid for the wiper motor. It will now be appreciated by those skilled in the art that these embodiments with a monostable limit switch are inexpensive and reliable and enable the control of a wiper motor comprising a limit switch through a single connecting lead.

In the embodiments comprising a relay as a controllable switching element certain difficulties may arise due to the layout of the current winding of the relay. That is, the drop in voltage on this relay winding should be as small as possible, which can be realized by using a wire with a correspondingly large cross-section with a small number of turns. On the other hand, however, it has to be ensured that current relay also reliably energizes, when the supply voltage is low and the wiper motor is charged to a small extent, that means a low motor current. In order to fulfill these requirements the current relay 20 may be provided with a subsidiary winding 98 which may be energized through the movable changeover contact 24 as illustrated in FIG. 4.

What is claimed is:

1. A circuit arrangement for driving a wiper motor, comprising: a controllable switching element for switching a motor operating circuit, a limit switch having a pair of normally closed contacts serially coupled with said switch element and said limit switch being mechanically coupled to the output of said wiper motor and being responsive thereto to open said normally closed contacts during a portion of the operating cycle of said wiper motor to provide a disconnection signal, said switching element being controllable by a manually actuable operating switch and by said disconnection signal of said limit switch, and wherein the disconnection signal of the limit switch is directly conducted to the switching element through the motor supply lead.

2. The circuit arrangement according to claim 1, wherein the limit switch is a circuit-breaker which is directly connected with the motor supply lead and the switching element responds to a change in the motor current.

3. The circuit arrangement according to claim 2, wherein the switching element is operated as a storage unit which maintains the motor current until it is interrupted by the limit switch when the operating switch is switched off.

4. The circuit arrangement according to claim 3, wherein the switching element is a current relay the winding of which is series connected with the limit switch to the motor operating circuit and the movable switching contact of which closes the motor operating circuit in the operating position.

5. The circuit arrangement according to claim 4, wherein the movable switching contacts may be directly changed over into the operating position by a driver rod of the operating switch.

6. The circuit arrangement according to claim 4, characterized wherein the switching path is bridged through the movable switching contact of the operating switch.

7. The circuit arrangement according to claim 6, wherein in the rest position the movable switching contact closes a short circuit for the driving motor.

8. The circuit arrangement according to claim 7, wherein the current relay is provided with an auxiliary winding which may be energized through the movable switching contact.

9. The circuit arrangement according to claim 1, wherein the switching element is a thyristor the firing circuit of which is controllable through the operating switch.

10. The circuit arrangement according to claim 9, wherein the switching path of the limit switch is bridged by a by-pass switching element.

11. The circuit arrangement according to claim 10, wherein the by-pass switching element is a resistor.

12. The circuit arrangement according to claim 10, wherein the by-pass switching element is a relay.

13. The circuit arrangement according to claim 10, wherein the by-pass switching element is a bimetal switch the filament winding of which is connected with the motor circuit.

14. The circuit arrangement according to claim 13, wherein the filament winding is serially connected with the limit switch and the switching path of the bimetal switch is closed in its rest position.

15. The circuit arrangement according to claim 13, wherein the filament winding is connected in parallel to the limit switch and the switching path of the bimetal switch is opened in its rest position.

16. The circuit arrangement according to claim 13, wherein the bimetal switch also provides an overcurrent circuit-breaker and is further provided with an additional set of contacts connected in series with the limit switch.

17. The circuit arrangement according to claim 1, wherein the limit switch is monostable in which during the instable switching phase changes interrupts the motor current.

18. The circuit arrangement according to claim 17, wherein the limit switch includes an energy storage unit which is charged in the stable switching phase and the energy of which is released in the instable switching phase provides a short duration interruption of current.

19. The circuit arrangement according to claim 18, wherein a spring element provides said energy storage unit.

20. The circuit arrangement according to claim 19, wherein the limit switch includes a pendulum which may be deflected against the tension of the spring element from a rest position in the stable switching phase, whereby the spring element is initially tensioned, and said pendulum in the instable switching phase swings beyond the rest position in reverse direction and thereby for a short duration removes a contact spring from a stationary contact.

21. The circuit arrangement according to claim 19, wherein a contact spring directly provides an energy storage unit which rests on a contact path of a switch wafer in the stable switching phase and slides over a contact gap in the instable switching phase.

22. The circuit arrangement according to claim 21, wherein the contact spring is deflected by an eccentric cam on the switch wafer in the plane of the contact path transversally to its longitudinal direction and that it is thereby initially tensioned and slides over a contact gap when it springs back.

23. The circuit arrangement according to claim 21, wherein the contact spring is deflected by a switching cam with an ascending contact flank projecting from the plane of the contact path so that it is thereby initially tensioned and during its springing back slides over the inclined flank being provided with a contact gap.

24. The circuit arrangement according to claim 21, wherein the contact spring is deflected and thereby initially tensioned by a tripping pin mounted on the switch wafer in guide motion of the contact path and during its springing back slides over a contact gap in opposite direction to the guide motion of the contact path.

25. The circuit arrangement according to claim 21, wherein said contact spring is provided with a generally U-shaped free end thereof for initially tension engaging a recess of the contact path and which during untensioning slides over a contact gap.

* * * * *